United States Patent [19]

Mayfeld

[11] 4,129,209
[45] Dec. 12, 1978

[54] BUCKET ELEVATOR

[76] Inventor: Friedrich Mayfeld, Kirschbaumweg 10, Westhofen, Westf., Fed. Rep. of Germany, 5842

[21] Appl. No.: 745,644

[22] Filed: Nov. 29, 1976

[30] Foreign Application Priority Data

Jan. 27, 1976 [FR] France .................. 76 02182

[51] Int. Cl.² .................................. B65G 17/42
[52] U.S. Cl. .................................. 198/712
[58] Field of Search ............ 198/307, 549, 556, 559, 198/708, 710, 712; 37/69, 83, 190, 191 R, 192 R; 214/21

[56] References Cited

U.S. PATENT DOCUMENTS

| 1,058,776 | 4/1913 | Mickel | 198/712 |
|---|---|---|---|
| 1,422,151 | 7/1922 | Walker | 198/712 |
| 1,838,362 | 12/1931 | Clark et al. | 198/712 |
| 2,339,938 | 1/1944 | Meyer | 198/559 |
| 2,528,195 | 10/1950 | Bolhar | 198/712 |
| 2,547,476 | 4/1951 | Lehmann | 198/556 |
| 2,987,165 | 6/1961 | Sheehan | 198/710 |
| 3,083,814 | 4/1963 | Meyer | 198/710 |
| 3,265,189 | 8/1966 | Larson et al. | 198/708 |
| 3,286,816 | 11/1966 | Knaust et al. | 198/708 |
| 3,749,228 | 7/1973 | Magaldi | 198/710 |

FOREIGN PATENT DOCUMENTS

| 506420 | 11/1928 | Fed. Rep. of Germany | 198/708 |
|---|---|---|---|
| 41282 | 8/1937 | Sweden | 198/712 |

Primary Examiner—Evon C. Blunk
Assistant Examiner—Richard K. Thomson
Attorney, Agent, or Firm—Kurt Kelman

[57] ABSTRACT

The buckets of a bucket elevator are attached to selected links of a drive chain by means of brackets on their bottom walls fastened to two projecting lugs on the chain links, the brackets being spaced further apart than the link pins securing the associated links to adjacent links. An apron on one transverse end wall of each bucket covers the gap between consecutive buckets during travel in a straight path.

7 Claims, 7 Drawing Figures

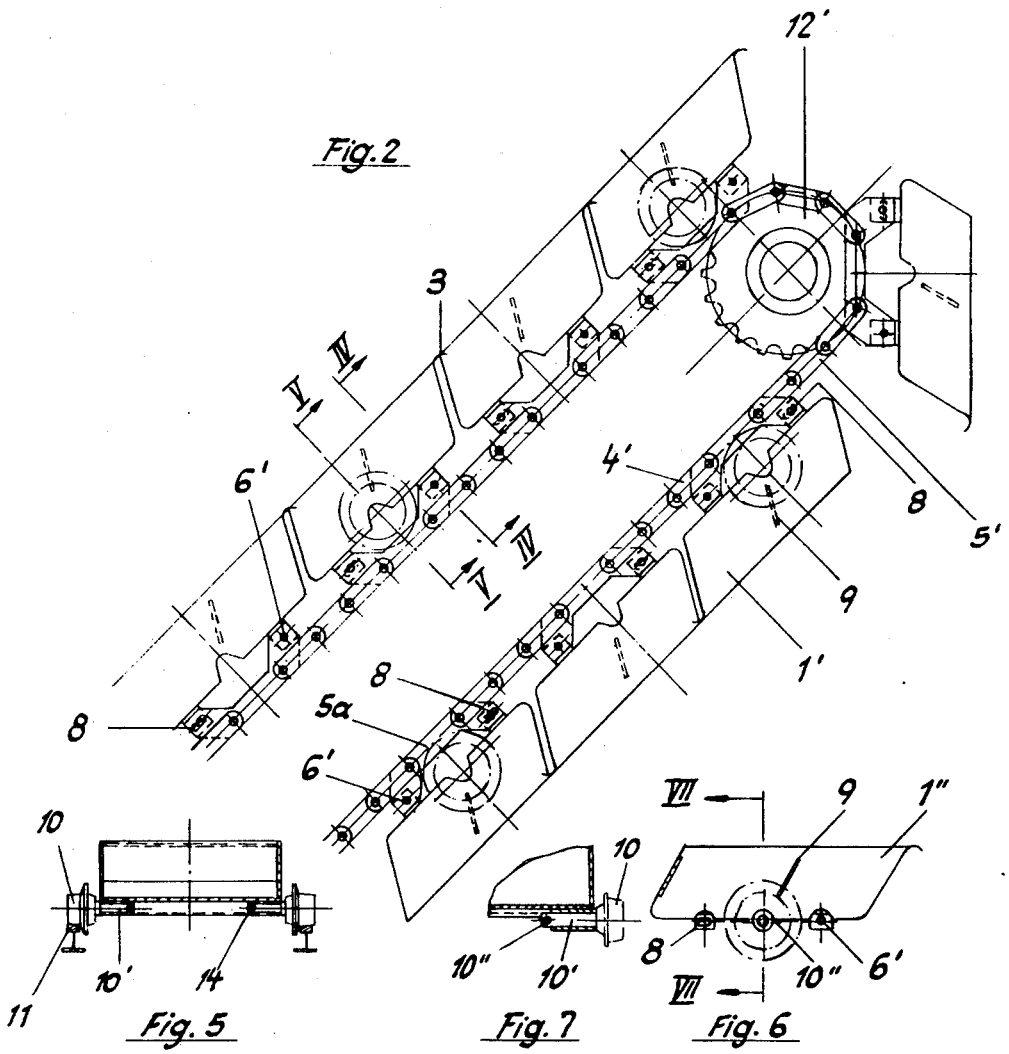

BUCKET ELEVATOR

This invention relates to conveyors for bulk material, and particularly to a bucket conveyor traveling in a steeply rising path and commonly referred to as a bucket elevator.

In steeply inclined conveyor systems in use nowadays the usual practice is to have a rigid connection between the traction chain and the buckets, the traction chains having rectangular bent plate links for attachment to the bottom of each trough. This arrangement has the disadvantage that the spacing of connecting screws is limited by the chain pitch. In case where the chain pitch is small in order that rotation at the return points may be achieved without shocks, there is no alternative but to arrange the two fixing points in the conveying direction close to each other, with the result that it is possible to obtain only a relatively small trough length which corresponds to a maximum of three chain pitches. This small pitch of troughs only allows a limited degree of upwardly directed movement and discharge of the conveyor. This is because the next following bucket would be unloaded in the upper reversing station before the preceding bucket has moved out of the unloading zone in the event the angle of inclination is relatively large, so that a portion of the conveyed material drops onto the back wall of the preceding bucket. Moreover, the attachment of the buckets is insufficient to withstand high centrifugal forces produced in the reversing station, and connections by screws between the buckets and the plate links of the traction chain are frequently loosened.

Another disadvantage of the rigid chain connection lies in the fact that the bottom of each bucket, when expanded by the action of heat, tends to increase the spacing between two traction chains. This causes marked wear to the teeth of the sprockets and of the plate links when the buckets run to the drum of the reversing station and causes deformation of the bottom of the bucket, eventually shearing off the connection bolts. The afore-mentioned fact causes annoying noises in the reversing station. Furthermore, blocking of the conveyor troughs when loading or unloading easily deforms the right-angle plates of chain links, so that the chain is brought to a disadvantageously inclined position.

It is a primary object of this invention to provide a bucket elevator in which wear of the operating elements is reduced as compared to known elevators, and in which wear, if any, does not readily affect performance.

It has been found that many of the difficulties enumerated above can be avoided by making the buckets much longer than the associated chain links, and by fastening the bottom wall of each bucket to the chain links by means of connectors engaging parts of the bottom wall spaced farther apart than the pivot axes of the link pins securing the associated chain link to longitudinally consecutive links.

Furthermore, it has been found to be advantageous to connect the buckets articulatedly to the drive chain with a lateral play transversely to the direction of movement of the buckets to enable the buckets to adapt their position relative to the chain without stress to irregularities of the track guiding the wheels and to differences in the chain spacing when the buckets move around the sprockets.

Other features, additional objects, and many of the attendant advantages of the invention will readily be appreciated as the same becomes better understood from the following detailed description of preferred embodiments when considered in connection with the appended drawing in which:

FIG. 2 illustrates a similar elevator in a view corresponding to that of FIG. 1;

FIG. 3 shows elements of the elevator of FIG. 2 in side elevation;

Figure 1:
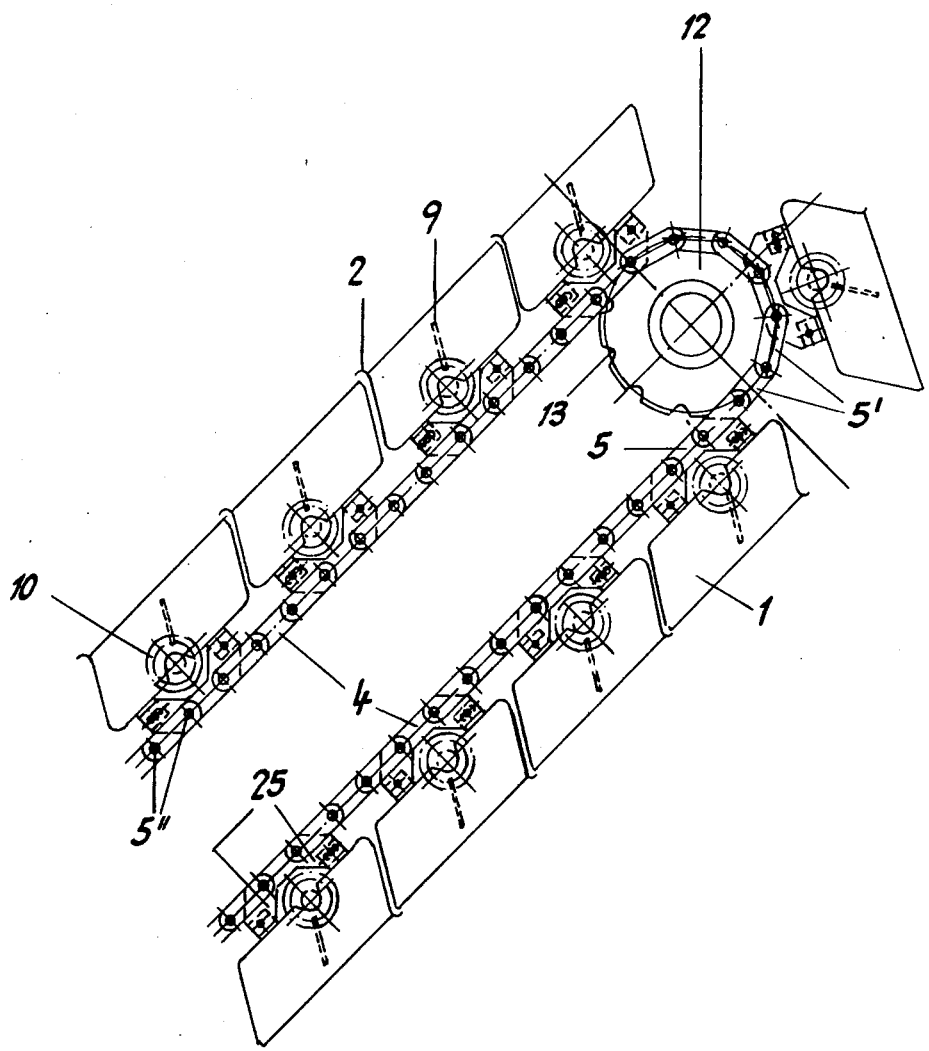
FIG. 1 shows a supercapacity continuous bucket elevator of the invention in fragmentary side-elevational section.

FIGS. 4 and 5 respectively show the elevator of FIG. 2 in partial section on the lines IV — IV and V — V;

FIG. 6 illustrates a modified bucket of the invention in side-elevational section; and FIG. 7 is a fragmentary sectional view of the bucket of FIG. 6 taken on the line VII — VII.

Referring now to the drawing in detail, and initially to FIG. 1, there is shown a continuous bucket elevator of the invention which is of the so-called super-capacity type capable of handling large-lump materials for high lifts. The buckets 1 are longer in their direction of movement than they are wide and are each equipped with wheels 10 traveling on guide rails 11 along the straight portions of their path, as is shown in FIG. 5 only. An apron 2 of approximately cylindrically arcuate shape about a transverse axis is integral with the trailing transverse end wall of each bucket 1 and covers the gap between consecutive buckets during straight upward travel. It will be understood that the buckets are filled from a non-illustrated chute at the lower end of their straight, upward path, and the aprons prevent portions of the load from falling through between consecutive buckets.

The buckets are mounted on selected links 5 of chains 4 separated from each other by three chain links 5'. The latter are of the conventional type consisting of two flat, straight, and elongated webs connected transversely by two pivot pins 5", each pivot pin being common to two links and defining the pivot axis about which the two links may move angularly relative to each other.

The webs of the links 5 have integral lugs 25 diverging obliquely from respective pivot pins 5" beyond the pivot axes. The free ends of the two lugs 25 define a laterally extending space z therebetween and, as shown in FIG. 4, one of the legs of L-shaped bracket 6 extends thereinto. The other leg of bracket 6 is affixed to the bottom wall of the bucket so that the bucket is mounted on the chain link with free lateral play. All pivot axes are uniformly spaced along the chains 4, that is, the spacing of the pivot axes associated with the selected links 5 is equal to the corresponding spacing of the connecting links 5'.

The connection between the chains 4 and the buckets 1 will be described in more detail hereinbelow with reference to modified embodiments of the invention. The illustrated, relatively great length of the buckets 1 in the direction of their movement is possible because of the wide spacing of the attached ends of chain link lugs 25. While the gaps between consecutive buckets are sealed by aprons 2 during loading of the buckets and straight upward travel, the buckets are spaced widely apart when the associated chains 4 travel over driven head sprockets 12 at the unloading station where the link pins 5" enter radially open notches 13 in the sprockets. No material discharged from one bucket 1 during travel around the sprockets 12 can be deflected toward the chains 4 and associated elements by another bucket 1. A transverse partition 9 in each bucket avoids the reduction in bucket capacity that would otherwise result from the increased length. The top of each partition 9 is approximately flush with the other bucket walls bounding the open side of the bucket, but its bottom need not reach the bottom wall of the bucket.

The bucket elevator shown in FIGS. 2 to 5 differs from the afore-described apparatus mainly in modified drive chains 4' and by the location of aprons 3 on the leading rather than the trailing transverse end walls of the buckets 1' to achieve substantially the same seal between consecutive buckets during loading and upward travel.

The chains 4' consist of selected, bucket-carrying links 5a separated by only three connecting links 5'. The spacing of the pivot axes or link pins on the links 5a is 50% greater than on the connecting links 5', thereby permitting an even greater spacing of the points of attachment of the bucket bottom walls to the lugs of the links 5a and a corresponding lengthening of the buckets 1'. As is evident from comparison of FIGS. 1 and 2, the otherwise unchanged buckets 1' are even farther separated from each other during reversal and unloading movement than are the buckets 1. To accommodate unevenly spaced link pins, the head sprockets 12' are provided with notches 13' spaced apart one half of the spacing of the link pins on the links 5'.

As is better seen in FIGS. 3 to 5, the short legs of L-shaped brackets 6 are welded to the bottom wall of each bucket 1'. The free legs are apertured at 8, and a pin 7 passes loosely through each aperture 8 and is fastened in corresponding apertures in lugs 25 of the associated chain link 5a, thereby permitting lateral movement of the bucket 1' between the laterally spaced webs of the lugs. The aperture 8 in one of each pair of brackets 6 is a slot elongated in the direction of elevator travel so that no stress is exerted on the chains 4' by thermal expansion and contraction of the bucket 1'.

The bottom wall of each bucket 1' is provided with an integral, transverse rib 26 in the loading space of the bucket and with a corresponding groove in its outer face. The rib 26 reinforces the bucket as do the brackets 6. Tubular bearings 14 are mounted in the grooves and receive the shafts 10' of the wheels 10.

In the further modified bucket 1'' illustrated in FIGS. 6 and 7, the bottom wall of the bucket is formed with three transverse ribs and corresponding grooves. Brackets 6' connected with lugs on links in the manner described above, but not specifically illustrated in FIGS. 6 and 7, are recessed in the two outer grooves, and the central groove receives the bearings for the wheel shafts 10'. The shafts 10' are axially secured by transverse pins 10''.

As is shown in FIG. 2, not all buckets 1' need be equipped with the wheels 10 under suitable conditions of operation, and this is desirable for reducing the weight of the moving elevator parts. The reduced height of the partitions 9, as described above, serves the same purpose.

Other modifications of the illustrated embodiments of the invention will readily suggest themselves to those skilled in the art on the basis of the above teachings. It should be understood, therefore, that the foregoing disclosure relates only to preferred embodiments of the invention, and that it is intended to cover all changes and variations in the examples of the invention herein chosen for the purpose of the disclosure which do not constitute departures from the spirit and scope of the appended claims.

What is claimed is:

1. A bucket elevator comprising:
   (a) an elongated link chain including a plurality of longitudinally consecutive link members,
      (1) each link member being secured to two other link members for relative angular movement about respective pivot axes, whereby two pivot axes are associated with each link member;
   (b) a plurality of buckets, each bucket including a bottom wall bounding a loading space in said bucket;
   (c) connecting means fastening the bottom wall of each bucket to two portions of a selected link member,
      (1) said two portions being spaced in the direction of chain elongation a distance greater than the corresponding spacing of the two pivot axes associated with said selected link member and the connecting means being articulatedly fastened to the two portions with sufficient lateral clearance to permit stress-free thermal expansion of the bottom wall of the bucket and play transverse to the direction of chain elongation between the connecting means and the two link member portions; and
   (d) drive sprockets for longitudinally moving said chain in a closed loop.

2. An elevator as set forth in claim 1, wherein said chain has two straight, parallel parts connected by arcuate parts, each bucket, when moving with said chain along said straight parts, defining a gap with another bucket, each bucket having two end walls transverse to said bottom wall and spaced in said direction, and an apron extending from one of said end walls toward said other bucket and covering said gap.

3. An elevator as set forth in claim 2, further comprising wheels on respective selected buckets, and a rail extending along one of said straight parts and being engaged by said wheels during movement of the selected buckets along said one straight part.

4. An elevator as set forth in claim 1, wherein said chain consists essentially of said selected link members and of connecting link members, the spacing of the pivot axes associated with said connecting link members being uniform and smaller than the spacing of the pivot axes associated with said selected link members, each selected link member being separated from another selected link member in said direction by the same number of connecting link members.

5. An elevator as set forth in claim 1, further comprising two pins securing each link member to respective longitudinally adjacent link members and defining said pivot axes, said drive means including a sprocket formed with a plurality of radial notches uniformly distributed about the circumference of said sprocket for receiving said pivot pins, the spacing of circumferentially consecutive notches being smaller than the spacing of said pivot axes.

6. An elevator as set forth in claim 1, further comprising a guide rail extending along a straight part of said chain, a shaft mounted on each of a plurality of selected buckets and defining an axis of rotation transverse to said direction of elongation, and a wheel mounted on said shaft for rotation about said axis of rotation and for rolling engagement with said guide rail, the bottom wall of each selected bucket being formed with a rib in said loading space and a corresponding groove open toward said chain, said shaft being received in said groove.

7. An elevator as set forth in claim 1, wherein each connecting means includes a pair of connecting members fixedly fastened to said bottom wall and a pair of connecting lugs constituting the two portions of the selected link member, each of the lugs having projecting free ends defining the lateral clearance therebetween, a respective one of the connecting members being received in the lateral clearance between the free lug ends, a pivot pin extending into respective apertures in the lug ends and articulatedly fastening each connecting member to an associated one of the lugs for joint movement in said direction, and the apertures in one of the connecting members being elongated slots permitting limited movement in the direction of chain elongation.

* * * * *